(12) United States Patent
Griffiths et al.

(10) Patent No.: US 6,843,973 B2
(45) Date of Patent: Jan. 18, 2005

(54) KRYPTON AND XENON RECOVERY SYSTEM

(75) Inventors: John Louis Griffiths, Pittsburgh, PA (US); Adam Adrian Brostow, Emmaus, PA (US)

(73) Assignee: Air Products and Chemicals, Allentown, PA (US)

(*) Notice: Subject to any disclaimer, the term of this patent is extended or adjusted under 35 U.S.C. 154(b) by 176 days.

(21) Appl. No.: 10/137,051

(22) Filed: May 1, 2002

(65) Prior Publication Data

US 2003/0206849 A1 Nov. 6, 2003

(51) Int. Cl.[7] .............................................. B01D 53/72
(52) U.S. Cl. ................ 423/262; 423/245.1; 423/245.3; 204/158.2; 204/157.3
(58) Field of Search ........................ 423/245.1, 245.3, 423/262; 204/158.2, 157.3

(56) References Cited

U.S. PATENT DOCUMENTS

| | | | | |
|---|---|---|---|---|
| 3,596,471 A | * | 8/1971 | Streich ........................ | 62/648 |
| 4,055,625 A | * | 10/1977 | Faugeras et al. ............ | 423/262 |
| 4,417,909 A | * | 11/1983 | Weltmer, Jr. ................ | 62/648 |
| 4,421,536 A | | 12/1983 | Mori et al. .................... | 62/18 |
| 5,122,173 A | | 6/1992 | Agrawal et al. ............... | 62/22 |
| 5,313,802 A | * | 5/1994 | Agrawal et al. .............. | 62/648 |
| 5,993,612 A | | 11/1999 | Rostaing et al. ............ | 204/158 |
| 6,565,821 B1 | * | 5/2003 | Fraysse .................. | 423/240 R |
| 2003/0129127 A1 | * | 7/2003 | Cook et al. ................. | 423/650 |

OTHER PUBLICATIONS

Larkin et al., "Production of Organic Oxygenates in the Partial Oxidation of Methane in a Silent Electric Discharge Reactor", *American Chemical Society* (2000).

* cited by examiner

*Primary Examiner*—Ngoc-Yen Nguyen
(74) *Attorney, Agent, or Firm*—Willard Jones, II

(57) ABSTRACT

In a process for the recovery of krypton and xenon, an oxygen-enriched stream containing krypton and/or xenon and hydrocarbons is removed from an air separation unit. A substantial portion of the hydrocarbons, especially methane, ethane, and acetylene, is removed from the oxygen-enriched stream prior to the distillation process. The hydrocarbon removal process includes, but is not restricted to, the hydrocarbons reacting with a portion of the oxygen present in the feed gas. The krypton and xenon are eventually recovered from the oxygen stream through a distillation process. The distillation process is performed in such a manner that at least a stream further enriched in both krypton and xenon is produced.

12 Claims, 6 Drawing Sheets

KRYPTON AND XENON RECOVERY SYSTEM

BACKGROUND OF THE INVENTION

The present invention relates to separation processes for purifying multicomponent fluids and separating such a fluid into its constituent components, and in particular to separation processes for the recovery of rare gases, such as krypton and xenon, from air and other such multicomponent fluids.

Krypton and xenon exist in the atmosphere in very small quantities, but are finding increasing application in industry and other uses. Xenon is being used for medical applications, including as an anesthetic, and in space applications as a propellant. Krypton is used in lighting applications and as an insulating gas in high efficiency windows. The typical source of krypton and xenon is atmospheric air, which contains approximately 1.14 ppm krypton and 0.087 ppm xenon.

In recovering krypton and xenon from air, it is common practice to distill liquid oxygen, which has been removed from the bottom of a lower-pressure column of a cryogenic air separation plant, to obtain an enriched stream containing krypton and xenon. Hydrocarbons within the air also are carried into the liquid oxygen and hence are concentrated during the subsequent concentrating process of krypton and xenon. The enrichment of the liquid hydrocarbons may create a flammable mixture. To avoid this potential hazard, removal of hydrocarbons by adsorption or replacement of oxygen by inert gases (such as nitrogen) is conventionally carried out, or the enrichment of krypton and xenon within their oxygen carrier is progressed to a state wherein the fluid does not enter the "region of flammability." The concentration of krypton and/or xenon in the stream is therefore dictated by the ability to suppress the potential for oxidation.

U.S. Pat. No. 5,122,173 (Agrawal, et al.) discloses a process wherein krypton and xenon are recovered from a liquid oxygen stream from a cryogenic air distillation unit. Most of the heavier hydrocarbons are removed in an adsorption step prior to distillation. However, more than 80% of methane and lighter hydrocarbons, such as ethane, ethylene, and acetylene, is not removed in an adsorption step. The distillation process simultaneously concentrates krypton and xenon while rejecting a substantial quantity of the methane present in the feed stream. Therefore, the methane removal primarily takes place through a distillation process.

U.S. Pat. No. 4,421,536 (Mori, et al.) discloses a process wherein krypton and xenon are recovered from a liquid oxygen stream from a cryogenic air distillation unit. A large portion of the methane present in the cryogenic air distillation unit feed stream is removed as a purge gas from a distillation column. The remaining hydrocarbons are removed through a catalytic oxidation and an adsorption process. Therefore, there is an equilibrium separation step (distillation) that precedes hydrocarbon removal by catalytic oxidation.

U.S. Pat. No. 5,993,612 (Rostaing, et al.) discloses a process for the purification of a feed gas using a hollow dielectric tube. A feed gas is passed through a hollow dielectric tube wherein it is converted, through the use of an electric field, into an atmospheric pressure plasma which is not in local thermodynamic equilibrium. On leaving the dielectric tube the gas passes over a reactive material for eliminating the reactive compounds from the gas to be purified. The impurities in the feed gas are removed through the use of a reactive material, wherein a hollow dielectric tube is used to aid in this reaction. The process typically requires the addition of oxygen to the feed gas in order to aid in the reaction between the impurities and the reactive material.

The reactions between oxygen and hydrocarbons, especially methane, in a corona discharge unit are discussed in "Production of Organic Oxygenates in the Partial Oxidation of Methane in a Silent Electric Discharge Reactor," by Larkin, et al., American Chemical Society (2000). A methane stream containing oxygen is fed to the corona discharge unit. This gas is then exposed to a silent electric discharge converting up to 59% of the methane to full and partial oxidation products. The process emphasizes the production of organic liquid oxygenates, a partial oxidation product.

A corona discharge unit is an example of a hydrocarbon removal system that can be employed prior to any distillation steps.

It is desired to have an improved process for recovering rare gases, such as krypton and/or xenon, from a multicomponent fluid.

It is further desired to have an improved process for recovering rare gases, such as krypton and/or xenon, from a multicomponent fluid which overcomes the difficulties and disadvantages of the prior art to provide better results.

It is still further desired to have an improved process for recovering rare gases, such as krypton and/or xenon, from a multicomponent fluid, such as purge from an air separation unit, which overcomes the difficulties and disadvantages of the prior art to provide better results by reducing the number of equilibrium separation steps, such as distillation or single-stage flash.

BRIEF SUMMARY OF THE INVENTION

The invention is a process for recovering at least one rare gas from a multicomponent fluid. There are several embodiments of the invention and variations thereof, as described below.

A first embodiment of the invention is a process for recovering at least one rare gas selected from a group containing krypton, xenon, neon, and helium from a multicomponent fluid containing oxygen, the at least one rare gas, and at least one hydrocarbon selected from a group containing methane, ethane, ethylene, and acetylene. The process, which uses a purifying means and a distillation column system having at least one distillation column, includes multiple steps. The first step is to withdraw the multicomponent fluid from an air separation unit adapted to produce at least an oxygen-enriched product and/or a nitrogen-enriched product. The second step is to feed a stream of the multicomponent fluid to the purifying means without pre-concentrating the at least one rare gas in the stream by an equilibrium separation prior to feeding the stream to the purifying means. The third step is to form a hydrocarbon-lean mixture in the purifying means, the mixture containing oxygen, the at least one rare gas, and less than about 20% of the at least one hydrocarbon in the stream of the multicomponent fluid. The fourth step is to withdraw at least a portion of the hydrocarbon-lean mixture from the purifying means. The fifth step is to eventually feed at least a portion of the hydrocarbon-lean mixture to a first distillation column. The sixth step is to remove from the distillation column system a stream rich in the at least one rare gas.

There are several variations of the first embodiment. In one variation, the purifying means includes a catalytic oxidizer bed. In another variation, the purifying means includes a combustor. In yet another variation, the purifying means comprises a corona discharge device. In still yet another variation, the purifying means comprises a cold plasma device. In still yet another variation, the distillation column system has at least two distillation columns.

In another variation of the first embodiment, the hydrocarbon-lean mixture is formed in the purifying means by reacting a portion of the oxygen with at least a portion of the at least one hydrocarbon, thereby forming at least one oxidation product and the hydrocarbon-lean mixture. A variant of this variation includes an additional step of removing the at least one oxidation product from the purifying means. In a variant of that variant, at least one adsorbent bed is used to remove at least a portion of the at least one oxidation product.

A second embodiment of the invention is a process for recovering at least one rare gas selected from a group containing krypton, xenon, neon, and helium from a multicomponent fluid containing oxygen, the at least one rare gas, and at least one hydrocarbon selected from a group containing methane, ethane, ethylene, and acetylene. The process, which uses a purifying means and a distillation column system having at least one distillation column, includes multiple steps. The first step is to withdraw the multicomponent fluid from an air separation unit adapted to produce at least an oxygen-enriched product and/or a nitrogen-enriched product. The second step is to feed a stream of the multicomponent fluid to the purifying means without preconcentrating the at least one rare gas in the stream by an equilibrium separation prior to feeding the stream to the purifying means, the purifying means being selected from a group containing a catalytic oxidizer bed, a combustor, a corona discharge device, and a cold plasma device. The third step is to react at least a portion of the oxygen with the at least one hydrocarbon in the purifying means, thereby forming in the purifying means at least one oxidation product and a hydrocarbon-lean mixture containing oxygen, the at least one rare gas, and less than about 20% of the at least one hydrocarbon in the stream of the multicomponent fluid. The fourth step is to withdraw at least a portion of the hydrocarbon-lean mixture from the purifying means. The fifth step is to eventually feed at least a portion of the hydrocarbon-lean mixture to a first distillation column. The sixth step is to remove from the distillation column system a stream rich in the at least one rare gas.

A third embodiment of the invention is a process for recovering at least one rare gas selected from a group containing krypton, xenon, neon, and helium from a multicomponent fluid containing oxygen, the at least one rare gas, and at least one hydrocarbon selected from a group containing methane, ethane, ethylene, and acetylene. The process uses a purifying means and a distillation column system having at least two distillation columns, each distillation column having a top and a bottom. The process includes multiple steps. The first step is to withdraw the multicomponent fluid from an air separation unit adapted to produce at least an oxygen-enriched and/or a nitrogen-enriched product. The second step is to feed a stream of the multicomponent fluid to the purifying means without preconcentrating the at least one rare gas in the stream by an equilibrium separation prior to feeding the stream to the purifying means. The third step is to form a hydrocarbon-lean mixture in the purifying means, the mixture containing oxygen, the at least one rare gas, and less than about 20% of the at least one hydrocarbon in the stream of the multicomponent fluid. The fourth step is to withdraw at least a portion of the hydrocarbon-lean mixture from the purifying means. The fifth step is to eventually feed at least a portion of the hydrocarbon-lean mixture to a first distillation column. The sixth step is to withdraw a liquid stream from the first distillation column at or near the bottom of the first distillation column. The seventh step is to feed at least a portion of the liquid stream to the second distillation column. The eighth step is to remove from the second distillation column at least one stream rich in the at least one rare gas.

In a variation of the third embodiment of the invention, the hydrocarbon-lean mixture is formed in the purifying means by reacting a portion of the oxygen with at least a portion of the at least one hydrocarbon, thereby forming at least one oxidation product and a hydrocarbon-lean mixture. A variant of that variation includes the further step of removing the at least one oxidation product from the purifying means.

A fourth embodiment of the invention is a process for recovering krypton and/or xenon from a multicomponent fluid containing krypton and/or xenon, oxygen, and at least one hydrocarbon selected from a group containing methane, ethane, ethylene, and acetylene. The process, which uses a purifying means and a distillation column system having at least one distillation column, includes multiple steps. The first step is to withdraw the multicomponent fluid from an air separation unit adapted to produce at least an oxygen-enriched product and/or a nitrogen-enriched product. The second step is to feed a stream of the multicomponent fluid to the purifying means without preconcentrating the krypton and/or xenon by an equilibrium separation prior to feeding the stream to the purifying means. The third step is to form a hydrocarbon-lean mixture in the purifying means, the mixture containing oxygen, krypton and/or xenon, and less than about 20% of the at least one hydrocarbon in the stream of the multicomponent fluid. The fourth step is to withdraw at least a portion of the hydrocarbon-lean mixture from the purifying means. The fifth step is to eventually feed at least a portion of the hydrocarbon-lean mixture to a first distillation column. The sixth step is to remove from the distillation column system a stream rich in the krypton and/or xenon.

In a variation of the fourth embodiment of the invention, the hydrocarbon-lean mixture is formed in the purifying means by reacting a portion of the oxygen with at least a portion of the at least one hydrocarbon, thereby forming at least one oxidation product and the hydrocarbon-lean mixture. A variant of this variation includes the further step of removing the at least one oxidation product from the purifying means.

A fifth embodiment of the invention is a process for recovering krypton and/or xenon from a multicomponent fluid containing krypton and/or xenon, oxygen, and at least one hydrocarbon selected from a group containing methane, ethane, ethylene, and acetylene. The process, which uses a purifying means and a distillation column system having at least one distillation column, includes multiple steps. The first step is to withdraw the multicomponent fluid from an air separation unit adapted to produce at least an oxygen-enriched product and/or a nitrogen-enriched product. The second step is to feed a stream of the multicomponent fluid to the purifying means without preconcentrating the krypton and/or xenon in the stream by an equilibrium separation prior to feeding the stream to the purifying means, the purifying means being selected from a group containing a catalytic oxidizer bed, a combustor, a corona discharge device, and a cold plasma device. The third step is to react at least a portion of the oxygen with the at least one hydrocarbon in the purifying means, thereby forming in the purifying means at least one oxidation product and a hydrocarbon-lean mixture containing oxygen, krypton and/or xenon, and less than about 20% of the at least one hydrocarbon in the stream of the multicomponent fluid. The fourth step is to withdraw at least a portion of the hydrocarbon-lean mixture from the purifying means. The fifth step is to eventually feed at least a portion of the hydrocarbon-lean mixture to a first distillation column. The sixth step is to remove from the distillation column system a stream rich in krypton and/or xenon.

A sixth embodiment of the invention is a process for recovering krypton and/or xenon from a multicomponent fluid containing krypton and/or xenon, oxygen, and at least one hydrocarbon selected from a group containing methane, ethane, ethylene, and acetylene. The process uses a purifying means and a distillation column system having at least two distillation columns, each distillation column having a top and a bottom. The process includes multiple steps. The first step is to withdraw the multicomponent fluid from an air separation unit adapted to produce at least an oxygen-enriched product and/or a nitrogen enriched product. The second step is to feed a stream of the multicomponent fluid to the purifying means without preconcentrating the krypton and/or xenon in the stream by an equilibrium separation prior to feeding the stream to the purifying means. The third step is to form a hydrocarbon-lean mixture in the purifying means, the mixture containing oxygen, krypton and/or xenon, and less than about 20% of the at least one hydrocarbon in the stream of the multicomponent fluid. The fourth step is to withdraw at least a portion of a hydrocarbon-lean mixture from the purifying means. The fifth step is to eventually feed at least a portion of the hydrocarbon-lean mixture to a first distillation column. The sixth step is to withdraw a liquid stream from the first distillation column at or near the bottom of the first distillation column. The seventh step is to feed at least a portion of the liquid stream to the second distillation column. The eighth step is to remove from the second distillation column at least one stream rich in krypton and/or xenon.

In a variation of the sixth embodiment of the invention, the hydrocarbon-lean mixture is formed in the purifying means by reacting a portion of the oxygen with at least a portion of the at least one hydrocarbon, thereby forming at least one oxidation product and the hydrocarbon-lean mixture. A variant of this variation includes the further step of removing the at least one oxidation product from the purifying means.

BRIEF DESCRIPTION OF THE DRAWINGS

The invention will be described by way of example with reference to the accompanying drawings, in which.

DETAILED DESCRIPTION OF THE INVENTION

The present invention is a process for recovering rare gases (or "noble gases") from a multicomponent fluid. Although the process is described herein as a process for recovering krypton and/or xenon, the invention also applies to the recovery of other gases, such as neon and helium.

The invention is a process for the recovery of krypton and/or xenon from a multicomponent fluid stream withdrawn from a cryogenic distillation air separation unit. An air separation unit separates air into one or more of the following components: oxygen, nitrogen, and argon by means of cryogenic distillation. An example is a double column producing nitrogen and oxygen as distillation products or a double column with an additional argon column.

An oxygen-enriched stream containing krypton, and/or xenon and hydrocarbons is removed from one of the cryogenic distillation columns and fed to a hydrocarbon removal system that does not include equilibrium separation, such as distillation or single-stage flash. There, a substantial portion of the hydrocarbons, especially methane, ethane, ethylene, and acetylene, is removed prior to further concentrating krypton and/or xenon by processes that include, but are not restricted to, equilibrium separation, such as distillation. The hydrocarbon removal process may involve, but is not restricted to, hydrocarbons reacting with a portion of the oxygen stream present in the feed gas. The krypton and/or xenon are eventually recovered from the oxygen stream through a distillation process. The distillation process is performed in such a manner that at least a stream further enriched in krypton and/or xenon is produced.

Figure 1:
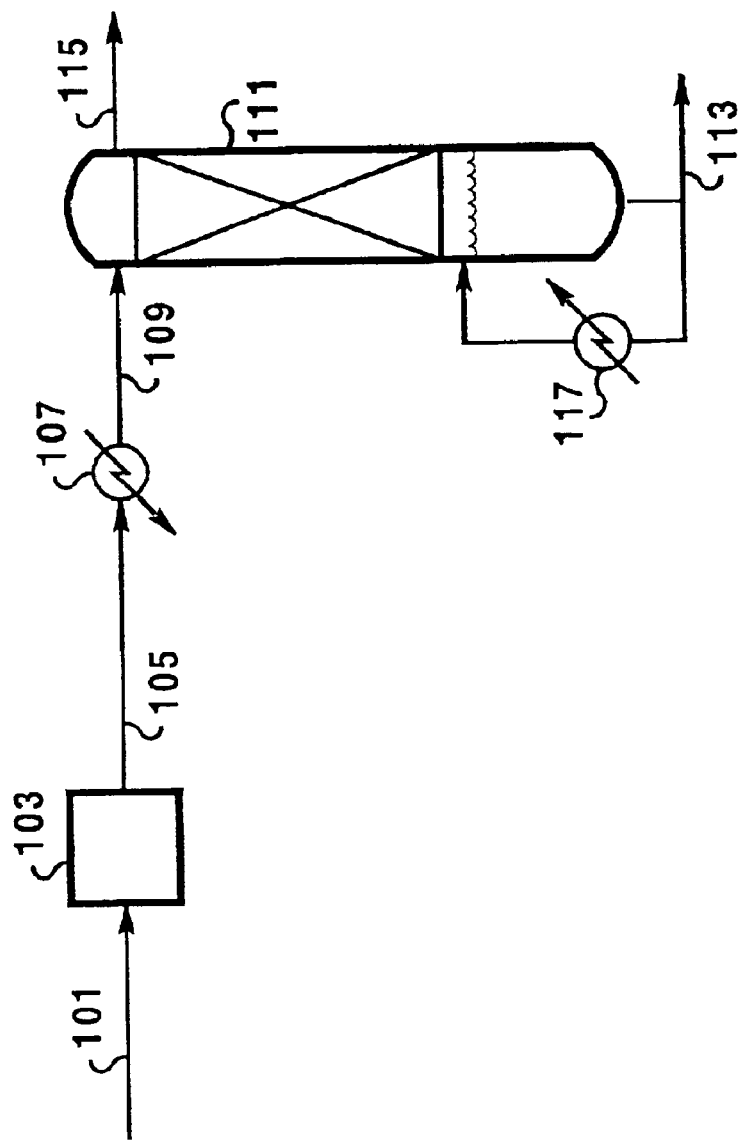
FIG. 1 is a schematic diagram of one embodiment of the present invention.

FIG. 1 illustrates an embodiment of the invention wherein krypton and/or xenon is/are recovered from a stream enriched in oxygen. Feed stream 101, which is from an air separation unit (not shown) and contains oxygen, krypton, xenon, and hydrocarbons, is fed to stream purifier 103. The stream purifier 103 removes the bulk of the hydrocarbons and/or other impurities present in feed stream 101 to produce a cleaned feed stream 105. For example, within stream purifier 103 a portion of the oxygen in feed stream 101 is reacted with the hydrocarbons and other combustible impurities in feed stream 101. The oxidation products are then removed in the stream purifier to produce cleaned feed stream 105. Cleaned feed stream 105 includes a large portion of the oxygen, krypton and xenon present in feed stream 101 but contains less than 20% of the initial hydrocarbon content, especially less than 20% of the methane.

Feed stream 105 is at least partially condensed in exchanger 107 to produce stream 109. Stream 109 is fed to distillation column 111 and separated through cryogenic distillation into at least stream 115 and stream 113, which is enriched in krypton and/or xenon. Exchanger 117 vaporizes a portion of the liquid in the bottom of distillation column 111 to provide boilup.

Figure 2:
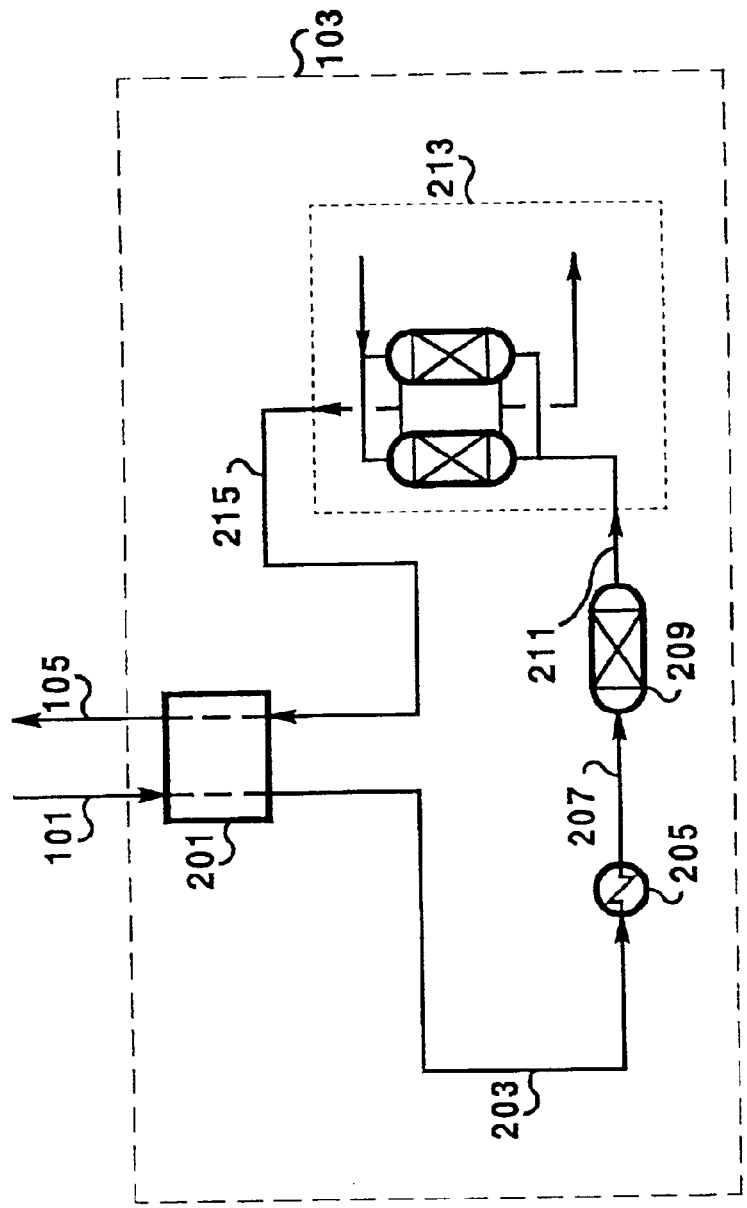
FIG. 2 is a schematic diagram of an alternate embodiment of the stream purifier used in the present invention.

FIG. 2 illustrates an embodiment of the invention wherein a catalytic oxidation process is used to purify stream 101. Stream 101 is warmed though indirect latent heat exchange in exchanger 201 to produce stream 203. Stream 203 is then further heated in heater 205 to a temperature typically between about 300° F. and 2000° F. Heater 205 may be, but is not restricted to, an electrical heater, an indirectly fired heater, or a directly fired heater. Stream 207 is passed through a catalytic oxidizer bed 209 wherein a catalyst encourages the reaction between the hydrocarbons and oxygen contained in stream 207. The resultant stream 211 contains only a small portion of the hydrocarbons, especially methane, found in stream 207. Stream 207 also contains oxidation products, which are removed using an adsorption process in adsorbent beds 213. Adsorbent beds 213 produce at least stream 215, which contains a high portion of the krypton and xenon found in stream 101. Stream 215 is cooled through indirect latent heat exchange in exchanger 201 to produce cleaned feed stream 105.

Figure 3:
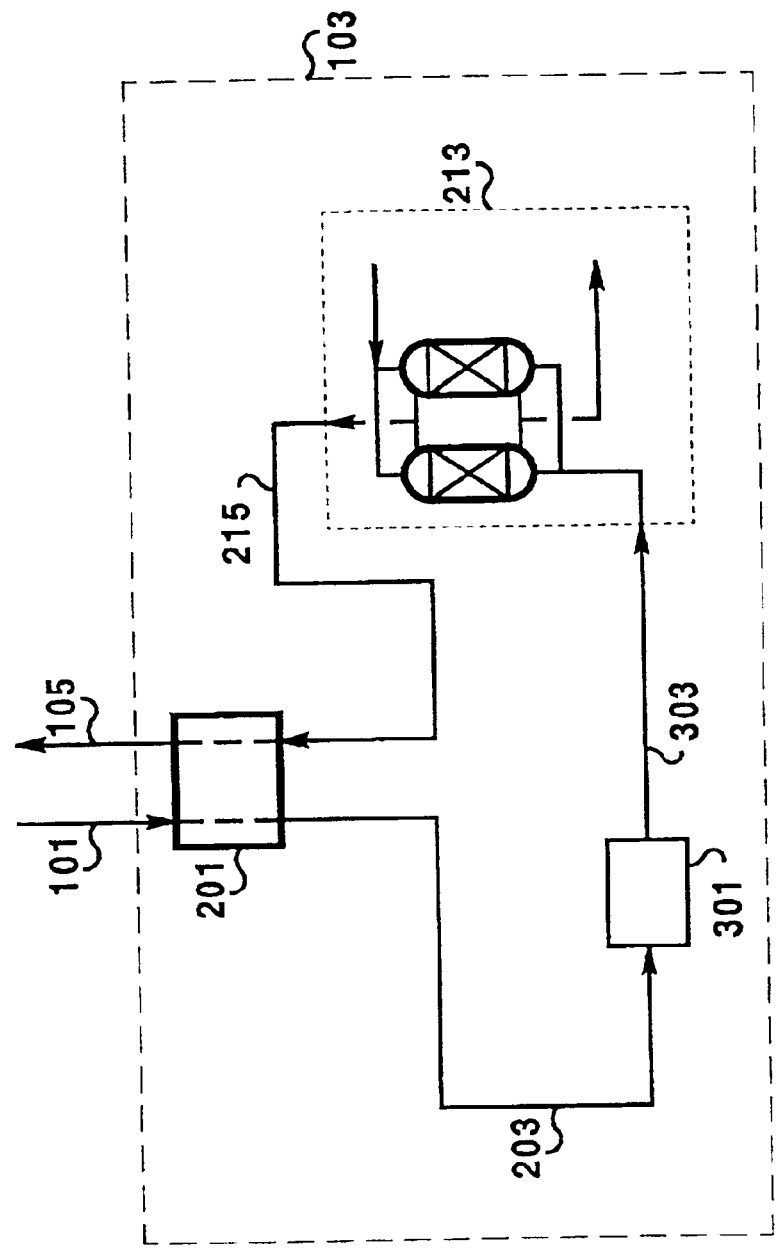
FIG. 3 is a schematic diagram of another alternate embodiment of the stream purifier used in the present invention.

FIG. 3 illustrates an embodiment of the invention wherein an electrical combustion process is used to purify stream 101. Stream 101 is warmed though indirect latent heat exchange in exchanger 201 to produce stream 203. Stream 203 is fed into a combustor 301 wherein oxygen is reacted with the hydrocarbons present in stream 203. Combustor 301 is a device in which stream 203 is heated by electrical means to high temperatures. Many different types of devices may be used for combustor 301, including but not limited to microwave generators, plasma generators, corona discharge units, and electrical discharge units. In such devices electricity may be used to physically break down a gas into free radicals. Oxygen free radicals have very high oxidation potentials and will react with any hydrocarbons present. Combustor 301 produces stream 303, a vapor. Stream 303 contains oxygen, krypton, xenon, oxidation products, and less than 20% of the hydrocarbons (especially methane) that were contained in stream 203. Stream 303 is fed to adsorbent beds 213 wherein a portion of the oxidation products are removed. Adsorbent beds 213 produce at least stream 215, which contains a high portion of the krypton and xenon found in stream 101. Stream 215 is cooled through indirect latent heat exchange in exchanger 201 to produce cleaned feed stream 105.

Figure 4:
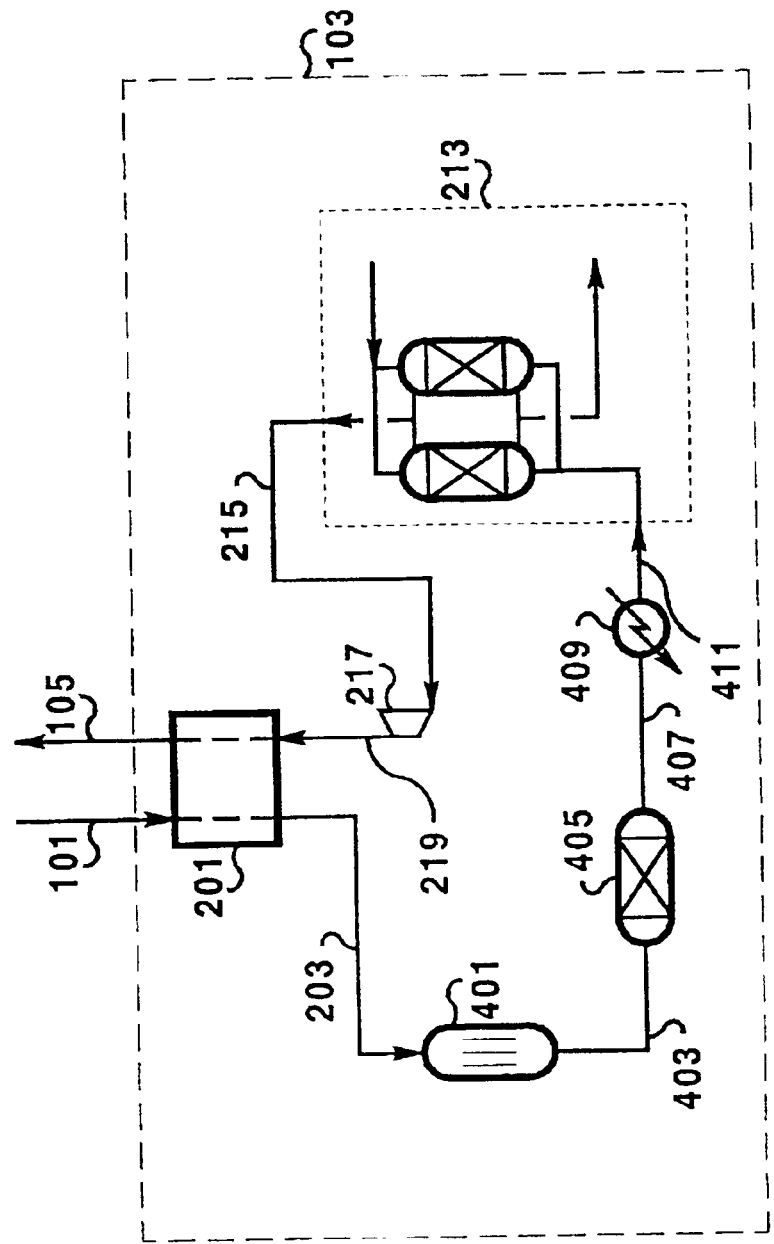
FIG. 4 is a schematic diagram of another alternate embodiment of the stream purifier used in the present invention.

FIG. 4 illustrates an embodiment of the invention wherein a corona discharge unit is used to purify stream 101. Stream 101 is warmed though indirect latent heat exchange in exchanger 201 to produce stream 203. Stream 203 is fed into a corona discharge unit 401, wherein the contents of stream 203 are exposed to a high frequency electrical field creating a plasma, which is not in local thermal equilibrium. The hydrocarbons and other impurities present in stream 203 react with oxygen and oxygen free radicals to produce oxidation products. Corona discharge unit 401 produces stream 403, which eventually is fed to reduction catalyst bed 405 wherein any high oxidation byproducts (e.g., ozone) are converted back to their constituent parts (e.g., oxygen). Reduction catalyst bed 405 produces stream 407, which is cooled in exchanger 409 and fed as stream 411 to adsorbent beds 213 wherein a portion of the oxidation products are removed. Adsorbent beds 213 produce at least stream 215, which contains a high portion of the krypton and xenon found in stream 101. Stream 215 is cooled through indirect latent heat exchange in exchanger 201 to produce cleaned feed stream 105.

Figure 5:
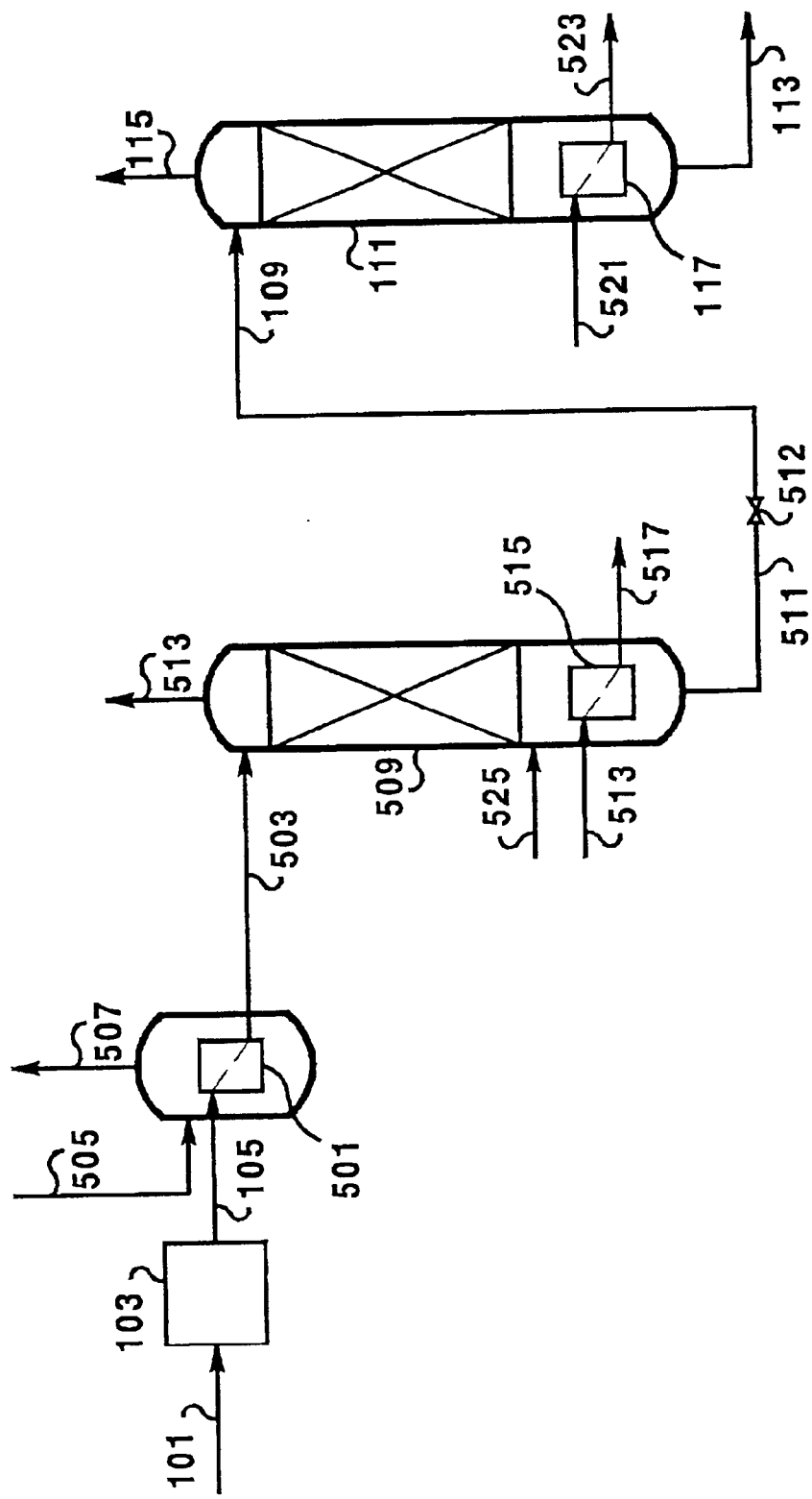
FIG. 5 is a schematic diagram of another embodiment of the invention.

FIG. 5 illustrates an embodiment of the invention wherein stream 105 exiting stream purifier 103 is purified in a two-step distillation process. Stream 105, a vapor, is fed to exchanger 501 and condensed through indirect latent heat exchange to produce stream 503, a liquid. Stream 505 is vaporized through indirect latent heat exchange in exchanger 501 to produce stream 507. Stream 503 is separated through cryogenic distillation in distillation column 509 into stream 511 and stream 513. Stream 513 contains a portion of the hydrocarbons, especially methane, contained in stream 503. Stream 511, a liquid, eventually is reduced in pressure in valve 512 to produce stream 109. Stream 515, a vapor, is condensed though indirect latent heat exchange in exchanger 517, producing stream 519 and vapor boilup for column 509. Stream 109 is separated by cryogenic distillation in distillation column 111 into stream 115 and stream 113, a product stream enriched in krypton and/or xenon. Stream 521, a vapor, is condensed through indirect latent heat exchange in exchanger 117 to produce stream 523. Stream 525, a vapor, may be introduced into column 509 at the bottom or at any other location within the column. The purpose of stream 525 is to substantially reduce the concentration of oxygen and/or hydrocarbons in stream 511. Stream 525 may contain, but not be limited to argon, nitrogen, and oxygen.

Figure 6:
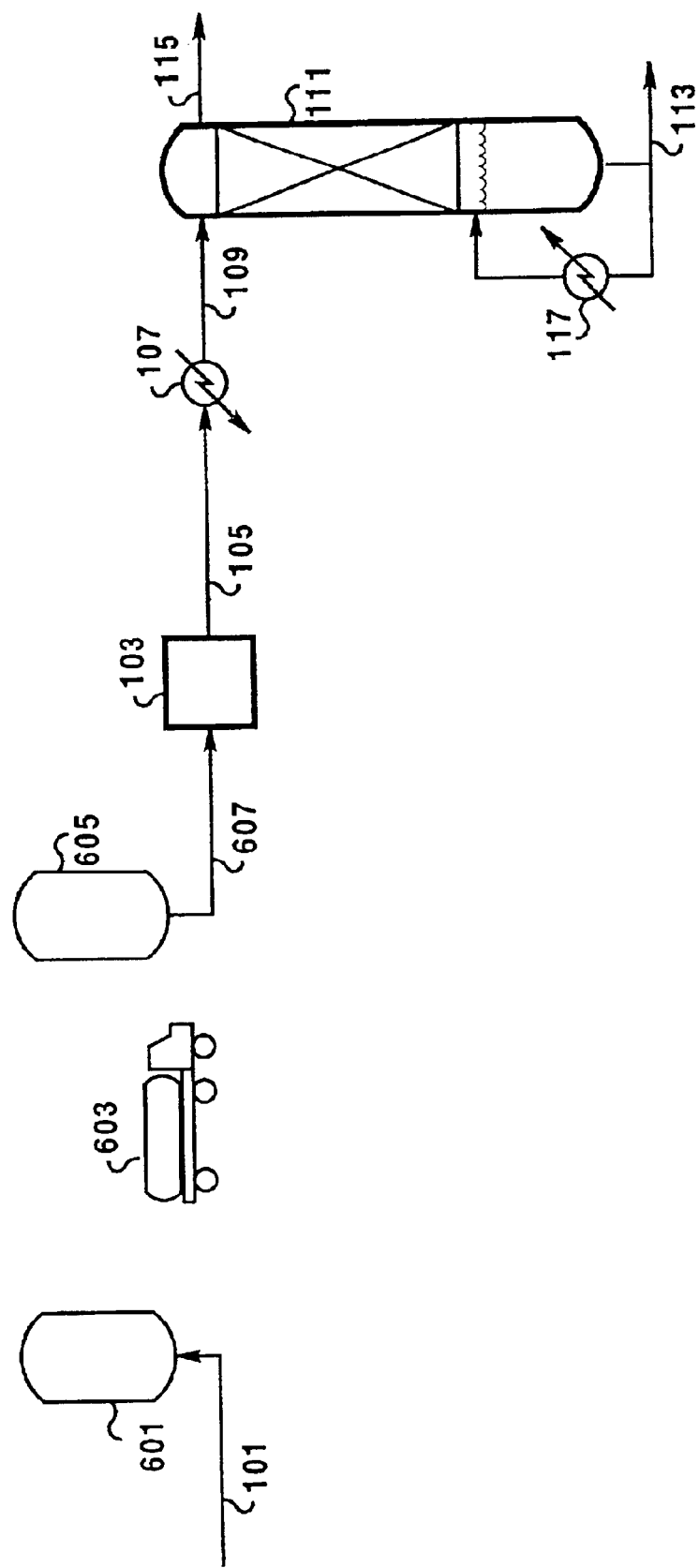
FIG. 6 is a schematic diagram of another embodiment of the present invention.

FIG. 6 illustrates an embodiment of the invention wherein the enriched oxygen undergoes storage prior to the recovery of the krypton and/or xenon. In this embodiment, stream 101 is fed to storage tank 601. Truck 603 periodically transfers fluid from tank 601 to storage tank 605. Stream 607 is removed from tank 605 and fed to stream purifier 103. Tank 605 also may be filled with enriched oxygen containing at least krypton and/or xenon, and hydrocarbons from other air separation units (not shown). Further, truck 603 is shown by way of example only, as many other types of fluid transfer means may be used to transfer fluid from storage tank 601 to tank 605.

Numerous modifications or additions may be applied to the embodiments shown in FIGS. 1–6. For example, the discussion has centered around a process producing at least one stream enriched in krypton and/or xenon, which is shown as stream 113 in FIGS. 1–6. It will be apparent to persons skilled in the art that the invention may be applied where additional streams, containing krypton and/or xenon, at other purities and or pressures may be required necessitating the use of further columns and/or other processes. One important aspect of the invention is that a portion of the products which are enriched in krypton and/or xenon may be produced from a distillation column.

In the previous discussions product stream 113 has been described as having a pressure equal to that of the distillation column from which stream 113 is withdrawn. It is entirely acceptable that the pressure of this stream may be changed before being delivered as product. Examples include but are not limited to: 1) pressure increased in a compressor, 2) pressure decreased in an expander, 3) pressure decreased in a throttling device, 4) pressure decreased in a turboejector, 5) pressure increased in a pump, and 6) pressure decreased in a dense fluid expander.

Refrigeration for the process has not been illustrated in the examples given, as refrigeration is not required to describe the essence of the invention. However, persons skilled in the art will recognize that many alternate refrigeration means exist. Examples include but are not limited to: 1) expansion of a portion of stream 105 to distillation column 111, 2) expansion of a portion of stream 115, 3) use of cryogenic liquids and/or gases not shown, and 4) thermal integration with another process.

In the discussion, reference is made to Aeventually reducing in pressure@. It will be understood by persons skilled in the art that this means other processing steps may exist before the pressure reduction. For example, it is common practice to cool liquid streams prior to their introduction to the distillation column. Warming cold returning vapor streams, such as stream 115, provides this cooling.

The reflux, or top feed, for the distillation column 111 is shown as stream 109. Other optional reflux streams exist. Examples include but are not limited to: 1) a liquid from the cryogenic air separation unit; and 2) secondary cryogenic liquids. In such arrangements, stream 109 may or may not be optionally required.

WORKED EXAMPLE

In the following worked example of the invention, as found in FIG. 1, stream 101 is purified in stream purifier 103 and then separated into streams 113 and 115. Flows and conditions for major streams can be found in the table below.

| Mole Frac | 101 | 105 | 109 | 113 | 115 |
|---|---|---|---|---|---|
| $N_2$ | 3.800E–03 | 3.801E–03 | 3.801E–03 | 3.906E–10 | 3.801E–03 |
| $O_2$ | 99.51% | 99.52% | 99.52% | 5.722% | 99.52% |
| Ar | 1.000E–03 | 1.000E–03 | 1.000E–03 | 8.731E–07 | 1.000E–03 |
| Kr | 5.690E–06 | 5.692E–06 | 5.692E–06 | 85.77% | 5.439E–07 |
| Xe | 4.500E–07 | 4.502E–07 | 4.502E–07 | 7.496% | 2.452E–10 |
| $CH_4$ | 5.000E–05 | 2.501E–08 | 2.501E–08 | 7.515E–04 | 2.050E–08 |
| $C_2H_6$ | 3.000E–05 | 1.501E–08 | 1.501E–08 | 2.499E–03 | 4.165E–12 |
| $C_3H_8$ | 8.860E–06 | 4.432E–09 | 4.432E–09 | 7.383E–04 | 2.443E–15 |
| $CO_2$ | 5.000E–06 | 1.416E–08 | 1.416E–08 | 2.355E–03 | 2.126E–11 |
| $H_2O$ |  | 2.254E–08 | 2.254E–08 | 3.755E–03 | 1.269E–25 |
| Flow (lbmol/hr) | 100.00 | 99.97 | 99.97 | 6.03E–04 | 99.97 |
| Temperature (° F.) | –290.10 | –288.10 | –293.03 | –249.50 | –292.89 |
| Pressure (psi) | 22.00 | 20.00 | 19.00 | 19.18 | 19.00 |

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A process for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least one distillation column, comprising the steps of:

withdrawing the multicomponent fluid from an air separation unit adapted to produce at least an oxygen-enriched product and/or a nitrogen-enriched product;

feeding a stream of the multicomponent fluid to the purifying means without preconcentrating the at least one rare gas in the stream by an equilibrium separation prior to feeding the stream to the purifying means;

forming a hydrocarbon-lean mixture in the purifying means, said mixture containing oxygen, the at least one rare gas, and less than about 20% of the at least one hydrocarbon in the stream of the multicomponent fluid;

withdrawing at least a portion of the hydrocarbon-lean mixture from the purifying means;

eventually feeding at least a portion of the hydrocarbon-lean mixture to a first distillation column; and removing from the distillation column system a stream rich in the at least one rare gas, wherein the purifying means comprises a catalytic oxidizer bed.

2. A process, for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least one distillation column, comprising the steps of:

withdrawing the multicomponent fluid from an air separation unit adapted to produce at least an oxygen-enriched product and/or a nitrogen-enriched product;

feeding a stream of the multicomponent fluid to the purifying means without preconcentrating the at least one rare gas in the stream by an equilibrium separation prior to feeding the stream to the purifying means;

forming a hydrocarbon-lean mixture in the purifying means, said mixture containing oxygen, the at least one rare gas, and less than about 20% of the at least one hydrocarbon in the stream of the multicomponent fluid;

withdrawing at least a portion of the hydrocarbon-lean mixture from the purifying means;

eventually feeding at least a portion of the hydrocarbon-lean mixture to a first distillation column; and removing from the distillation column system a stream rich in the at least one rare gas, wherein the purifying means comprises a combustor.

3. A process, for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least one distillation column, comprising the steps of:

withdrawing the multicomponent fluid from an air separation unit adapted to produce at least an oxygen-enriched product and/or a nitrogen-enriched product;

feeding a stream of the multicomponent fluid to the purifying means without preconcentrating the at least one rare gas in the stream by an equilibrium separation prior to feeding the stream to the purifying means;

forming a hydrocarbon-lean mixture in the purifying means, said mixture containing oxygen, the at least one rare gas, and less than about 20% of the at least one hydrocarbon in the stream of the multicomponent fluid;

withdrawing at least a portion of the hydrocarbon-lean mixture from the purifying means;

eventually feeding at least a portion of the hydrocarbon-lean mixture to a first distillation column; and removing from the distillation column system a stream rich in the at least one rare gas, wherein the purifying means comprises a corona discharge device.

4. A process for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least one distillation column, comprising the steps of:

withdrawing the multicomponent fluid from an air separation unit adapted to produce at least an oxygen-enriched product and/or a nitrogen-enriched product;

feeding a stream of the multicomponent fluid to the purifying means without preconcentrating the at least one rare gas in the stream by an equilibrium separation prior to feeding the stream to the purifying means;

forming a hydrocarbon-lean mixture in the purifying means, said mixture containing oxygen, the at least one rare gas, and less than about 20% of the at least one hydrocarbon in the stream of the multicomponent fluid;

withdrawing at least a portion of the hydrocarbon-lean mixture from the purifying means;

eventually feeding at least a portion of the hydrocarbon-lean mixture to a first distillation column;

removing from the distillation column system a stream rich in the at least one rare gas; and removing the at least one oxidation product from the purifying means, wherein the hydrocarbon-lean mixture is formed in the purifying means by reacting a portion of the oxygen with at least a portion of the at least one hydrocarbon, thereby forming at least one oxidation product and the hydrocarbon-lean mixture.

5. A process, for recovering at east one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least one distillation column, comprising the steps of:

withdrawing the multicomponent fluid from an air separation unit adapted to produce at least an oxygen-enriched product and/or a nitrogen-enriched product;

feeding a stream of the multicomponent fluid to the purifying means without preconcentrating the at least one rare gas in the stream by an equilibrium separation prior to feeding the stream to the purifying means;

forming a hydrocarbon-lean mixture in the purifying means, said mixture containing oxygen, the at least one rare gas, and less than about 20% of the at least one hydrocarbon in the stream of the multicomponent fluid;

withdrawing at least a portion of the hydrocarbon-lean mixture from the purifying means;

eventually feeding at least a portion of the hydrocarbon-lean mixture to a first distillation column;

removing from the distillation column system a stream rich in the at least one rare gas; and removing the at least one oxidation product from the purifying means, wherein the hydrocarbon-lean mixture is formed in the purifying means by reacting a portion of the oxygen with at least a portion of the at least one hydrocarbon, thereby forming at least one oxidation product and the hydrocarbon-lean mixture, and wherein at least one adsorbent bed is used to remove at least a portion of the at least one oxidation product.

6. A process, for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least one distillation column, comprising the steps of:

withdrawing the multicomponent fluid from an air separation unit adapted to produce at least an oxygen-enriched product and/or a nitrogen-enriched product;

feeding a stream of the multicomponent fluid to the purifying means without preconcentrating the at least one rare gas in the stream by an equilibrium separation prior to feeding the stream to the purifying means;

forming a hydrocarbon-lean mixture in the purifying means, said mixture containing oxygen, the at least one rare gas, and less than about 20% of the at least one hydrocarbon in the stream of the multicomponent fluid;

withdrawing at least a portion of the hydrocarbon-lean mixture from the purifying means;

eventually feeding at least a portion of the hydrocarbon-lean mixture to a first distillation column; and removing from the distillation column system a stream rich in the at least one rare gas, wherein the distillation column system has at least two distillation columns.

7. A process for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least two distillation columns, each distillation column having a top and a bottom, comprising the steps of:

a) withdrawing the multicomponent fluid from an air separation unit adapted to produce at least an oxygen-enriched product and/or a nitrogen-enriched product;

b) feeding a stream of the multicomponent fluid to the purifying means without preconcentrating the at least one rare gas in the stream by an equilibrium separation prior to feeding the stream to the purifying means;

c) forming a hydrocarbon-lean mixture in the purifying means, said mixture containing oxygen, the at least one rare gas, and less than about 20% of the at least one hydrocarbon in the stream of the multicomponent fluid;

d) withdrawing at least a portion of the hydrocarbon-lean mixture from the purifying means;

e) eventually feeding at least a portion of the hydrocarbon-lean mixture to a first distillation column;

f) withdrawing a liquid stream from the first distillation column at or near the bottom of the first distillation column;

g) feeding at least a portion of the liquid stream to the second distillation column; and h) removing from the second distillation column at least one stream rich in the at least one rare gas.

8. A process, for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least two distillation columns, each distillation column having a too and a bottom, comprising the steps of:

a) withdrawing the multicomponent fluid from an air separation unit adapted to produce at least an oxygen-enriched product and/or a nitrogen-enriched product;

b) feeding a stream of the multicomponent fluid to the purifying means without preconcentrating the at least one rare gas in the stream by an equilibrium separation prior to feeding the stream to the purifying means;

c) forming a hydrocarbon-lean mixture in the purifying means, said mixture containing oxygen, the at least one rare gas, and less than about 20% of the at least one hydrocarbon in the stream of the multicomponent fluid;

d) withdrawing at least a portion of the hydrocarbon-lean mixture from the purifying means;

e) eventually feeding at least a portion of the hydrocarbon-lean mixture to a first distillation column;

f) withdrawing a liquid stream from the first distillation column at or near the bottom of the first distillation column;

g) feeding at least a portion of the liquid stream to the second distillation column; and h) removing from the second distillation column at least one stream rich in the at least one rare gas, wherein the hydrocarbon-lean mixture is formed in the purifying means by reacting a portion of the oxygen with at least a portion of the at least one hydrocarbon, thereby forming at least one oxidation product and the hydrocarbon-lean mixture.

9. A process for recovering at least one rare gas selected from a group consisting of krypton, xenon, neon, and helium from a multicomponent fluid containing oxygen, the at least one rare gas, and at least one hydrocarbon selected from a group consisting of methane, ethane, ethylene, and acetylene, said process using a purifying means and a distillation column system having at least two distillation columns, each distillation column having atop and a bottom, comprising the steps of:

a) withdrawing the multicomponent fluid from an air separation unit adapted to produce at least an oxygen-enriched product and/or a nitrogen-enriched product;

b) feeding a stream of the multicomponent fluid to the purifying means without preconcentrating the at least one rare gas in the stream by an equilibrium separation prior to feeding the stream to the purifying means;

c) forming a hydrocarbon-lean mixture in the purifying means, said mixture containing oxygen, the at least one rare gas, and less than about 20% of the at least one hydrocarbon in the stream of the multicomponent fluid;

d) withdrawing at least a portion of the hydrocarbon-lean mixture from the purifying means;

e) eventually feeding at least a portion of the hydrocarbon-lean mixture to a first distillation column;

f) withdrawing a liquid stream from the first distillation column at or near the bottom of the first distillation column;

g) feeding at least a portion of the liquid stream to the second distillation column;

h) removing from the second distillation column at least one stream rich in the at least one rare gas, and removing the at least one oxidation product from the purifying means, wherein the hydrocarbon-lean mixture is formed in the purifying means by reacting a portion of the oxygen with at least a portion of the at least one hydrocarbon, thereby forming at least one oxidation product and the hydrocarbon-lean mixture.

10. A process for recovering krypton and/or xenon from a multicomponent fluid containing krypton and/or xenon, oxygen, and at least one hydrocarbon selected from a group consisting of methane, ethane, ethylene, and acetylene, said process using a purifying means and a distillation column system having at least two distillation columns, each distillation column having a top and a bottom, comprising the steps of:

a) withdrawing the multicomponent fluid from an air separation unit adapted to produce at least an oxygen-enriched product and/or a nitrogen-enriched product;

b) feeding a stream of the multicomponent fluid to the purifying means without preconcentrating the krypton and/or xenon in the stream by an equilibrium separation prior to feeding the stream to the purifying means;

c) forming a hydrocarbon-lean mixture in the purifying means, said mixture containing oxygen, krypton and/or xenon, and less than about 20% of the at least one hydrocarbon in the stream of the multicomponent fluid;

d) withdrawing at least a portion of a hydrocarbon-lean mixture from the purifying means;

e) eventually feeding at least a portion of the hydrocarbon-lean mixture to a first distillation column;

f) withdrawing a liquid stream from the first distillation column at or near the bottom of the first distillation column;

g) feeding at least a portion of the liquid stream to the second distillation column; and h) removing from the second distillation column at least one stream rich in krypton and/or xenon.

11. A process, for recovering krypton and/or xenon from a multicomponent fluid containing krypton and/or xenon, oxygen, and at least one hydrocarbon selected from a group consisting of methane, ethane, ethylene, and acetylene, said process using a purifying means and a distillation column system having at least two distillation columns, each distillation column having a tot and a bottom, comprising the steps of:

a) withdrawing the multicomponent fluid from an air separation unit adapted to produce at least an oxygen-enriched product and/or a nitrogen-enriched product;

b) feeding a stream of the multicomponent fluid to the purifying means without preconcentrating the krypton and/or xenon in the stream by an equilibrium separation prior to feeding the stream to the purifying means;

c) forming a hydrocarbon-lean mixture in the purifying means, said mixture containing oxygen, krypton and/or xenon, and less than about 20% of the at least one hydrocarbon in the stream of the multicomponent fluid;

d) withdrawing at least a portion of a hydrocarbon-lean mixture from the purifying means;

e) eventually feeding at least a portion of the hydrocarbon-lean mixture to a first distillation column;

f) withdrawing a liquid stream from the first distillation column at or near the bottom of the first distillation column;

g) feeding at least a portion of the liquid stream to the second distillation column; and h) removing from the second distillation column at least one stream rich in krypton and/or xenon, wherein the hydrocarbon-lean mixture is formed in the purifying means by reacting a portion of the oxygen with at least a portion of the at least one hydrocarbon, thereby forming at least one oxidation product and the hydrocarbon-lean mixture.

12. A process for recovering krypton and/or xenon from a multicomponent fluid containing krypton and/or xenon, oxygen, and at least one hydrocarbon selected from a group consisting of methane, ethane, ethylene, and acetylene, said process using a purifying means and a distillation column system having at least two distillation columns, each distillation column having a too and a bottom, comprising the steps of:

a) withdrawing the multicomponent fluid from an air separation unit adapted to produce at least an oxygen-enriched product and/or a nitrogen-enriched product;

b) feeding a stream of the multicomponent fluid to the purifying means without preconcentrating the krypton and/or xenon in the stream by an equilibrium separation prior to feeding the stream to the purifying means;

c) forming a hydrocarbon-lean mixture in the purifying means, said mixture containing oxygen, krypton and/or xenon, and less than about 20% of the at least one hydrocarbon in the stream of the multicomponent fluid;

d) withdrawing at least a portion of a hydrocarbon-lean mixture from the purifying means;

e) eventually feeding at least a portion of the hydrocarbon-lean mixture to a first distillation column;

f) withdrawing a liquid stream from the first distillation column at or near the bottom of the first distillation column;

g) feeding least a portion of the liquid stream to the second distillation column;

h) removing from the second distillation column at least one stream rich in krypton and/or xenon, and removing the at least one oxidation product from the purifying means, wherein the hydrocarbon-lean mixture is formed in the purifying means by reacting a portion of the oxygen with at least a portion of the at least one hydrocarbon, thereby forming at least one oxidation product and the hydrocarbon-lean mixture.

* * * * *

UNITED STATES PATENT AND TRADEMARK OFFICE
CERTIFICATE OF CORRECTION

PATENT NO. : 6,843,973 B2
DATED : January 18, 2005
INVENTOR(S) : John Louis Griffiths et al.

It is certified that error appears in the above-identified patent and that said Letters Patent is hereby corrected as shown below:

Column 11,
Line 31, change the word "east" to -- least --.
The line should read "A process, for recovering at least one rare gas selected…"

Column 12,
Line 66, change the word "too" to the word -- top --
The line should read "….columns, each distillation column having a top and a bottom,.."

Column 15,
Line 10, change the word "too" to the word -- top --
The line should read "…distillation column having a top and a bottom, comprising the…"

Signed and Sealed this

Tenth Day of May, 2005

JON W. DUDAS
*Director of the United States Patent and Trademark Office*